C. T. HUNT.
NUT LOCK.
APPLICATION FILED MAY 29, 1914.
1,263,770.
Patented Apr. 23, 1918.
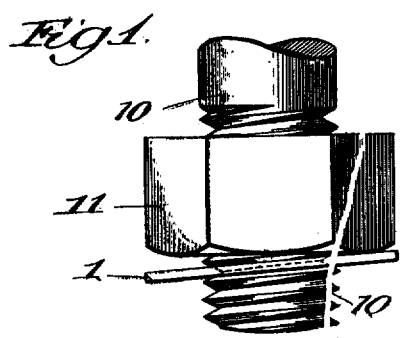
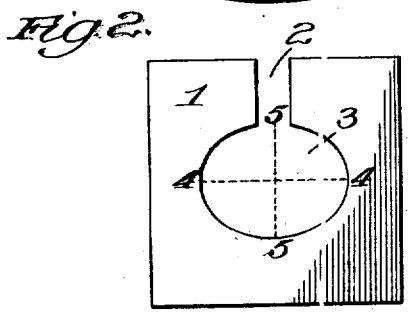
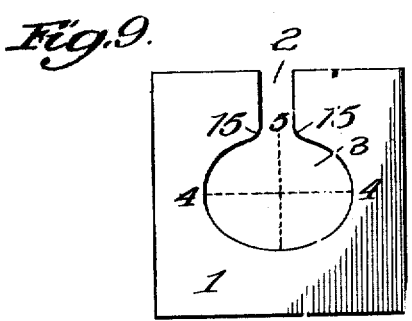
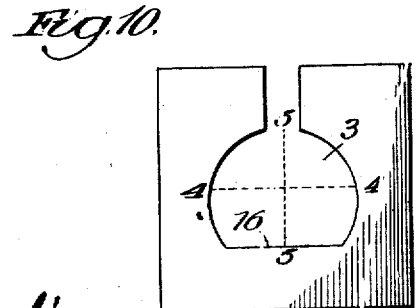
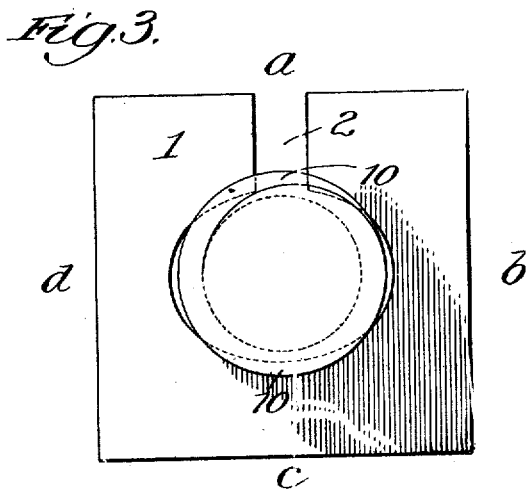
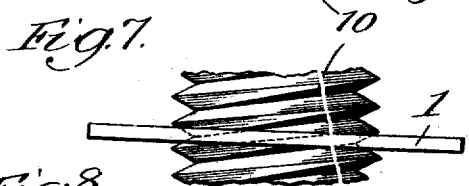
Witnesses:
Inventor:
Charles T. Hunt

UNITED STATES PATENT OFFICE.

CHARLES T. HUNT, OF LOS ANGELES, CALIFORNIA, ASSIGNOR TO UNIVERSAL NUT LOCK COMPANY, OF LOS ANGELES, CALIFORNIA, A CORPORATION OF CALIFORNIA.

NUT-LOCK.

1,263,770.  Specification of Letters Patent.  Patented Apr. 23, 1918.

Application filed May 29, 1914. Serial No. 841,750.

*To all whom it may concern:*

Be it known that I, CHARLES T. HUNT, a citizen of the United States, and a resident of Los Angeles, in the county of Los Angeles and State of California, have invented certain new and useful Improvements in Nut-Locks, of which I do declare the following to be a full, clear, and exact description, reference being had to the accompanying drawing, forming a part of this specification.

The present invention seeks to provide a simple, cheap and practical construction of nut lock which can be readily placed in position upon the bolt and when in such position will serve to prevent the nut working loose under the jars and strains to which the bolt and nut may be subjected. The invention consists in the novel construction of nut lock hereinafter described, illustrated in the accompanying drawings and particularly pointed out in the claims at the end of this specification.

Figure 1 is a view in elevation of a bolt and nut with my improved nut lock in position to lock the nut. Fig. 2 is a top view of my improved nut lock. Fig. 3 is an end view of the threaded portion of the bolt with the nut lock in position thereon. Fig. 4 is a side view showing a portion of the bolt with the nut lock thereon, this view being taken from the side of the nut lock designated *a*. Fig. 5, Fig. 6, and Fig. 7 are views similar to Fig. 4, but taken from the points designated on Fig. 3 by the letters *b*, *c* and *d* respectively. Fig. 8 is a view in central longitudinal section through the nut lock and bolt shown in Fig. 3. Fig. 9 and Fig. 10 are views similar to Fig. 2 but showing slightly modified forms of my nut lock.

In Letters Patent No. 1,032,605, granted to me July 16, 1912, there is shown a nut lock formed of a thin, annular disk or plate of resilient material, such as steel, that is cut away or slotted, a tooth being provided at each end of the slot adapted to project inwardly and engage the bolt. The nut lock of my present invention is similarly formed of a thin metal plate, preferably of steel and stamped to form a slot that extends outwardly from the bolt hole. A characteristic feature of my present invention is that the hole formed in the nut lock has an effective diameter that is less in one direction and greater in another direction than the diameter of the threads of the bolt on which the nut lock is designed to be used; so that while a portion of the nut lock at one end of the minor axis of the elliptical hole 3 is between the threads of the bolt at a point close to the nut, the portion of the nut lock at the opposite end of the minor axis of the hole 3 will be between the threads at a greater distance from the face of the nut. By this means, the thin plate comprising my nut lock extends at an angle to the axis of the bolt, with the result that when the nut tends to work loose, the initial pressure on one side of the nut lock plate causes a cramping or binding of the plate against the threads in the line of the minor axis of the bolt hole and effectively serves to prevent the working loose of the nut.

Referring to the accompanying drawing, 1 designates a thin metal plate of which my improved nut lock is formed, the outer or peripheral portion of this plate being of any convenient shape. As shown, a slot 2 is cut at one side of the plate, this slot extending from the hole 3 of the plate through the outer edge thereof. In Fig. 2, the dotted line 4 designates the major axis of the hole 3, while the dotted line 5 represents the minor axis of the hole 3. 10 designates the bolt and 11 denotes the threaded nut upon the bolt. By reference to Fig. 3, it will be seen that the diameter of the hole 3 in the nut lock plate is less in one direction, viz., in the direction of its minor axis 5, than the diameter of the threaded portion of the bolt 10, and it will also be seen that the diameter of the hole 3 is greater in the line of the major axis 4 than the diameter of the threaded portion of the bolt. By reference to Fig. 2, it will further be seen that the thread engaging portions of the nut lock plate are in the same plane. Inasmuch as the hole 3 of the plate has its major axis larger than the threaded portion of the bolt, the nut lock plate can be placed on the bolt by merely slipping a part of the plate opposite one end of its minor axis 5 over the end of the thread of the bolt and the plate can then be turned down onto the nut as the broader part of the hole 3 (in the direction of its major axis 4) is of greater diameter than the threaded portions of the bolt and hence permits the nut lock plate to cross the threads in order to allow the point of the nut lock plate at the opposite end of the minor axis to enter between the threads of the bolt. When the nut lock plate is thus placed upon the bolt, it will extend at an angle thereto corresponding to the pitch of the thread and will extend, consequently, at an angle to the outer surface of the nut. Hence, when the nut lock plate is screwed up against the nut, the nut lock plate will bear most firmly against one side of the nut, and any tendency of the nut to work loose will therefore cause a cramping action of the nut lock plate, which will firmly wedge the portions of the plate at the ends of the minor axis 5 of the hole 3 securely against the walls of the bolt threads.

In placing my improved nut lock plate upon the bolt it is not necessary that the plate should be expanded as the normal size of the plate and shape of its hole are such as to enable the nut lock plate to be readily screwed onto the bolt either by a wrench or by hand.

In the drawing I have shown, for the purpose of better illustration, the hole of the nut lock plate exaggerated in the direction of its major axis, although it will be understood that it is only necessary that the hole, in such direction, shall be sufficiently large to enable the plate to cross the thread of the bolt as shown in Figs. 7 and 8.

The distinctive feature of my invention, viz., forming the nut lock plate with a hole of such shape that the nut lock plate can cross the thread of the bolt, may be embodied in various ways. Thus, for example, in Fig. 9 of the drawing, I have shown a somewhat modified form of nut lock plate in which the corners 15 at the slotted portion of the plate are slightly rounded off, instead of being square, as shown in Fig. 2, although I regard the form shown in Fig. 2 as preferable, for the reason that when the cramping action is exerted upon the nut lock plate, under the tendency of the nut to work loose, there will be a tendency of the square corners at the inner end of the slot 2 to become embedded in the bolt.

Again, in Fig. 10 I have shown another modified form of the invention in which the minor axis of the hole 3 of the plate is obtained by forming that part of the plate opposite the slot 2 with a slight inward extension 16, the hole of the nut lock plate, in this form of the invention, being circular except for the extension 16. Other modifications of the invention may be made without departing from the scope of the appended claims.

Having thus described my invention, what I claim as new and desire to secure by Letters Patent is:—

1. The combination with a threaded bolt and a nut thereon having a flat outer face at right angles to the axis of the bolt, of a nut lock comprising a thin resilient plate flat throughout and of uniform thickness arranged to be turned against the flat outer face of the nut, said locking plate having a polygonal outer edge and a non-threaded opening therein having a curved edge, portions of the edge of said opening on opposite sides thereof fitting the thread groove of the bolt with an intermediate portion of said grooved edge crossing the bolt thread in a diagonal direction and closely adjacent thereto to thereby maintain said locking plate at a slight angle to the flat outer face of said nut and with one edge portion of the flat inner face of said plate engaging said nut, substantially as described.

2. The combination with a threaded bolt and a nut thereon having a flat outer face at right angles to the axis of the bolt, of a nut lock comprising a thin, resilient plate flat throughout and of uniform thickness, said locking plate having a polygonal outer edge and a non-threaded opening therein having a minor axis less than the diameter of the bolt thread and a major axis slightly greater than such diameter, the edge portions of said opening adjacent the minor axis thereof fitting within the thread groove of the bolt with the edge portion at one end of the major axis of the opening crossing the bolt thread in a diagonal direction, whereby said locking plate is maintained on said bolt with its flat inner face at a slight angle to the flat outer face of said nut, substantially as described.

3. The combination with a threaded bolt and a nut thereon having a flat outer face at right angles to the axis of the bolt, of a nut lock comprising a thin, resilient plate having a flat inner face arranged to be turned against the flat outer face of the nut, said locking plate having a polygonal outer edge, a non-threaded opening therein and a slot extending from said opening to the outer edge, the edge of said opening being curved and arranged to fit within the thread groove of the bolt through the greater portion of its circumference with one portion of said edge crossing the bolt thread in a diagonal direction to thereby maintain said locking plate on said bolt at a slight angle to the flat outer face of said nut and with one edge portion of the flat inner face of said plate engaging said nut.

4. The combination with a threaded bolt and a nut thereon having a flat outer face at right angles to the axis of the bolt, a nut lock comprising a thin, resilient plate flat throughout and of uniform thickness, said locking plate having a polygonal outer edge, a non-threaded opening therein and a slot extending from said opening to the outer edge, said opening having a minor axis less than the diameter of the bolt thread and a major axis slightly greater than such diameter, the edge portions of said opening adjacent the minor axis thereof being arranged to fit within the thread groove of the bolt with the edge portion at one end of the major axis of the opening crossing the bolt thread in a diagonal direction to thereby maintain said locking plate on said bolt at a slight angle to the flat outer face of said nut and with one edge portion of the inner face of said plate engaging said nut.

CHARLES T. HUNT.

Witnesses:
J. I. MELLEN,
J. A. McLAUGHLIN, Jr.

Copies of this patent may be obtained for five cents each, by addressing the "Commissioner of Patents Washington, D. C."